(12) United States Patent
Akerman

(10) Patent No.: US 12,254,602 B2
(45) Date of Patent: Mar. 18, 2025

(54) REDUCING BACKSCATTERED ELECTRON INDUCED ERRORS

(71) Applicant: Applied Materials Israel Ltd., Rehovot (IL)

(72) Inventor: Lior Akerman, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 522 days.

(21) Appl. No.: 17/678,744

(22) Filed: Feb. 23, 2022

(65) Prior Publication Data
US 2023/0267574 A1 Aug. 24, 2023

(51) Int. Cl.
*G06T 5/70* (2024.01)
*G06T 5/50* (2006.01)

(52) U.S. Cl.
CPC .......... *G06T 5/70* (2024.01); *G06T 5/50* (2013.01); *G06T 2207/10061* (2013.01); *G06T 2207/20224* (2013.01)

(58) Field of Classification Search
CPC ........................................................ G06T 5/70
See application file for complete search history.

(56) References Cited

U.S. PATENT DOCUMENTS

| | | | |
|---|---|---|---|
| 6,670,610 B2 | 12/2003 | Shemesh et al. | |
| 7,476,879 B2* | 1/2009 | Lozes | B82Y 40/00 430/30 |
| 7,498,591 B2* | 3/2009 | Lozes | H01J 37/3174 430/30 |
| 8,709,269 B2 | 4/2014 | Shemesh | |
| 9,046,475 B2 | 6/2015 | Langer et al. | |
| 10,811,219 B2 | 10/2020 | Shneyour et al. | |
| 2013/0279793 A1* | 10/2013 | Toyoda | G06T 7/001 382/145 |
| 2018/0328905 A1* | 11/2018 | Jacobi | G01N 23/2251 |
| 2019/0362933 A1* | 11/2019 | Takagi | G03F 7/70616 |
| 2020/0058461 A1* | 2/2020 | Takman | H05G 1/265 |
| 2021/0272770 A1* | 9/2021 | Sohda | H01J 37/153 |
| 2021/0319977 A1* | 10/2021 | Liu | H01J 37/1474 |
| 2022/0005668 A1 | 1/2022 | Gutman et al. | |
| 2023/0244152 A1* | 8/2023 | Wang | G03F 7/706843 430/270.1 |
| 2024/0194442 A1* | 6/2024 | Straka | H01J 37/28 |

FOREIGN PATENT DOCUMENTS

WO  WO-2021259738 A1 * 12/2021  ............... G03F 1/36

OTHER PUBLICATIONS

Klevenhagen, S.C., Implication of electron backscattering for electron dosimetry, 1991 (Year: 1991).*

\* cited by examiner

*Primary Examiner* — Kevin Ky
(74) *Attorney, Agent, or Firm* — Kilpatrick Townsend & Stockton LLP

(57) ABSTRACT

A method for improving a quality of a secondary electron image of a region of a sample, the method may include obtaining a backscattered electron (BSE) image of the region and a secondary electron (SE) image of the region; wherein the BSE image and the SE image are generated by scanning of the region with an electron beam; processing the BSE image and the SE image to provide a processed BSE image and a processed SE image; and generating a BSE compensated SE image, wherein the generating comprises applying one or more selected BSE correction factors on one or more parts of the processed BSE image.

13 Claims, 9 Drawing Sheets

REDUCING BACKSCATTERED ELECTRON INDUCED ERRORS

BACKGROUND OF THE INVENTION

Secondary electrons (SE) of interest are generally emitted from a thin (for example 2-3 nm) layer at a surface of a sample that is illuminated by an electron beam. SE of interest that impinge near edges of surface structural elements may travel near the edge, while staying at a distance of 2-3 nm from the edge over a much longer distance than when they are far from the edges.

The illumination of the sample by the electron beam also results in an emission of backscattered electrons (BSE). The emitted BSE may also trigger the emission of additional SE. BSE are emitted also from below the surface of the sample. When BSE reach the surface of the sample they trigger the emission of the additional SE.

Accordingly, when a certain point of the sample is illuminated, surface emitted SE and additional SE are emitted and may be sensed by a SE detector. In a SE image of a region of the sample the value of the SE image pixel that corresponds to the illuminated point will be affected by the SE of interest and the additional SE. In various evaluation processes such as inspection, review and metrology the additional SE may introduce evaluation process errors.

There is growing need to improve the quality of an SE image by reducing the impact of the additional SE on the SE image.

BRIEF SUMMARY OF THE INVENTION

There may be provided a system, method and a non-transitory computer readable medium for reducing BSE induced error.

There may be provided a method for improving a quality of a secondary electron image of a region of a sample, the method may include (a) obtaining a backscattered electron (BSE) image of the region and a secondary electron (SE) image of the region; wherein the BSE image and the SE image are generated by scanning of the region with an electron beam; (b) processing the BSE image and the SE image to provide a processed BSE image and a processed SE image; (c) evaluating BSE induced error reduction obtained for multiple BSE correction factors; (d) selecting, out of the multiple BSE correction factors, one or more selected BSE correction factors; and (e) applying the one or more selected BSE correction factors on one or more parts of the processed BSE image and on one or more corresponding parts of the processed SE image to provide a BSE compensated SE image.

There may be provided a non-transitory computer readable medium for improving a quality of a secondary electron image of a region of a sample, the non-transitory computer readable medium stores instructions for: (a) obtaining a backscattered electron (BSE) image of the region and a secondary electron (SE) image of the region; wherein the BSE image and the SE image are generated by scanning of the region with an electron beam; (b) processing the BSE image and the SE image to provide a processed BSE image and a processed SE image; (c) evaluating BSE induced error reduction obtained for multiple BSE correction factors; (d) selecting, out of the multiple BSE correction factors, one or more selected BSE correction factors; and (e) applying the one or more selected BSE correction factors on one or more parts of the processed BSE image and on one or more corresponding parts of the processed SE image to provide a BSE compensated SE image.

There may be provided system for improving a quality of a secondary electron image of a region of a sample, the system may include a processing circuit that is configured to: (a) obtain a backscattered electron (BSE) image of the region and a secondary electron (SE) image of the region; wherein the BSE image and the SE image are generated by scanning of the region with an electron beam; (b) process the BSE image and the SE image to provide a processed BSE image and a processed SE image; (c) evaluate BSE induced error reduction obtained for multiple BSE correction factors; (d) select, out of the multiple BSE correction factors, one or more selected BSE correction factors; and (e) apply the one or more selected BSE correction factors on one or more parts of the processed BSE image and on one or more corresponding parts of the processed SE image to provide a BSE compensated SE image.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE INVENTION

Figure 1:
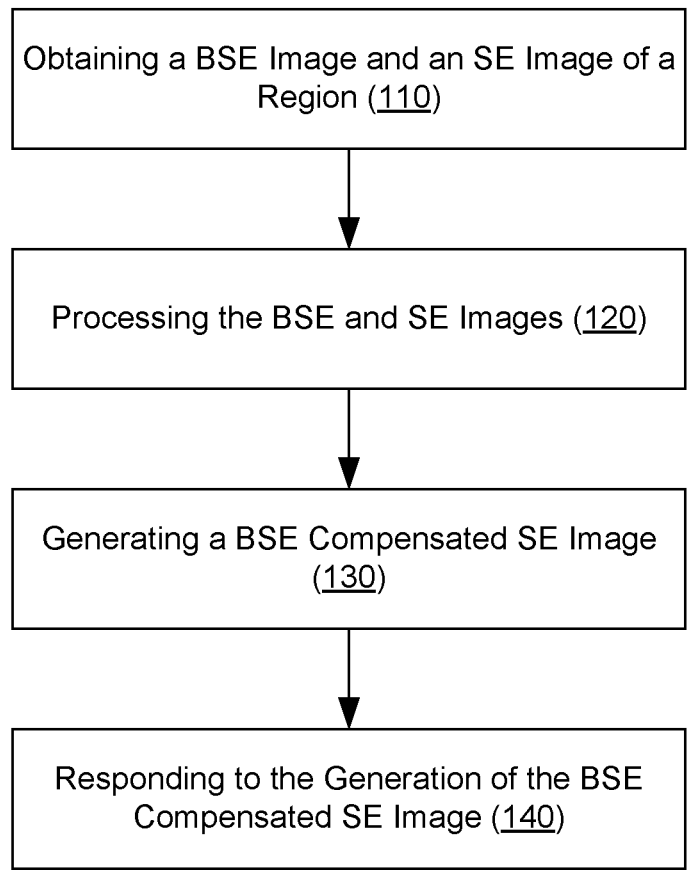
FIG. 1 is an example of a method.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may, for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

The term "corresponding" when referring to different images means located at the same location in the different images, for example at a same combination of row value and column value.

The term "region" of a sample may be the entire sample or only one or more parts of the region. The sample may be a semiconductor wafer or another sample.

The term "underlaying" may be located beneath the surface of the sample, below the layer from which surface SE (not near edge) are emitted.

Ignoring random noise, the additional SE value of a SE image pixel is proportional to a BSE signal of the corresponding BSE image pixel multiplied by a physical factor that is a function of various factors including underlayer structures of the sample. For example, assuming that there is an underlayer line that once illuminated provides BSE signals that are stronger by a factor of 1.3 than its surroundings then the additional SE resulting from illuminating the underlayer line will be stronger by a factor of 1.3 than additional SE resulting from illuminating the surroundings of the underlayer line.

FIG. 1 illustrates a method 100 for improving a quality of a secondary electron image of a region of a sample.

Method 100 may start by step 110 of obtaining a BSE image of the region and a SE image of the region.

The BSE image and the SE image can be generated by scanning of the region with an electron beam (also referred to as a primary electron beam). Step 110 may include the scanning. Alternatively, step 110 may not include the scanning but rather receiving the BSE image and the SE image.

Step 110 may be followed by step 120 of processing the BSE image and the SE image to provide a processed BSE image and a processed SE image.

Step 110 may be followed by step 120 of processing the BSE image and the SE image to provide a processed BSE image and a processed SE image.

The processing may be done to improve the accuracy of the outcome of method 100.

Step 120 may include at least one of the following:

Smoothing the SE image to provide a smoothed SE image.

Applying a gradient operation on the smoothed SE image to provide a gradient SE image.

Smoothing the BSE image to provide a smoothed BSE image.

Applying a gradient operation on the smoothed BSE image to provide a gradient BSE image.

Thresholding the gradient BSE image to provide the BSE image. The thresholding may include applying a threshold that has a value that is set based on a range of pixel values of pixels of the gradient BSE image. For example—the threshold may be set to a value that may passing a certain percent of the pixels and resetting the other pixels. For example—passing the pixels having the highest X percent values. X may be 5, 10, 25, 20, 25, 30, 40, 45 percent and the like—or may have any other value. The thresholding may include resetting (for example zeroing) pixels of the gradient BSE image that have a value that is below the threshold. Pixels above the threshold may be remain unchanged.

The smoothing may remove random noise and may increase the signal to noise ratio. The smoothing can include applying any smoothing function—such as but not limited to performing a convolution with an averaging filter or a gaussian filter.

Step 120 may be followed by step 130 of generating a BSE compensated SE image. The generating may include applying one or more selected BSE correction factors on one or more parts of the processed BSE image.

Step 130 may include or may be preceded by at least one out of:

Evaluating BSE induced error reduction obtained for multiple BSE correction factors.

Testing the BSE induced error reduction for each one of the multiple BSE correction factors. The number of BSE correction factors and their values may be determined in any manner.

Repeating, for each of the multiple BSE correction factors, (a) multiplying the processed BSE image by the BSE correction factor to provide a first intermediate image, (b) subtracting the first intermediate image from the processed SE image to provide a second intermediate image, (c) multiplying the second intermediate image by the processed BSE image to provide a third intermediate image, and (d) calculating a parameter of the third intermediate image. The parameter of the third intermediate image may be the sum of pixels, but may be any other parameter reflecting the strength of the SE gradients above BSE gradients.

Repeating (assuming that a BSE correction factor is applied on a part of an image), for each of the multiple BSE correction factors, (a) multiplying the part of the processed BSE image by the BSE correction factor to provide a part of a first intermediate image, (b) subtracting the part of the first intermediate image from a corresponding part of the processed SE image to provide a part of a second intermediate image, (c) multiplying the part of the second intermediate image by the part of the processed BSE image to provide a part of a third intermediate image, and (d) calculating a parameter of the part of the third intermediate image. Steps (a) till (d) may repeated from multiple parts.

Selecting, out of the multiple BSE correction factors, one or more selected BSE correction factors. The one or more selected BSE correction factors may be a single BSE correction factor. The single BSE correction factor may be applied on the entire processed BSE image. The one or more selected BSE correction factor may include two or more selected BSE correction factors to be applied on two or more parts of the processed BSE image. The two or more parts of the processed BSE image may cover the entire processed BSE image or may cover only some of the parts of the processed BSE image. The two or more parts may be selected to at least partially cover underlaying structural elements of the sample that emit BSE. Two or more of these underlaying structural elements may be located at the same depth. At least two of these underlaying structural elements may be located at different depts. Two or more of the underlying structural elements may belong to a same sample layer. At least two of underlaying structural elements may belong to different sample layers. The two or more parts of the processed BSE image may be defined regardless of the expected locations of the underlaying structural elements. For example—the processed BSE image may be virtually segmented to parts—for example rectangular parts.

Applying the one or more selected BSE correction factors on one or more parts of the processed BSE image and on one or more corresponding parts of the processed SE image to provide a BSE compensated SE image.

Repeating, for each of the parts: (a) multiplying the part of the processed BSE image by the selected BSE correction factor to provide an intermediate image and (b) subtracting the intermediate image from a corresponding part of the processed SE image.

When there are two or more parts, applying an additional step for reducing or eliminating difference between one part of the processed SE image to another, especially at the border between adjacent parts. The additional step may include smoothing, and the like.

Step 130 may be followed by step 140 of responding to the generation of the BSE compensated SE image. This may include at least one of storing the BSE compensated SE image, transmitting the BSE compensated SE image, or further processing the BSE compensated SE image. The further processing may be a part of an evaluation process such as metrology, defect detection, review, and the like. For example—the BSE compensated SE image can be compared to one or more other BSE compensated SE images, compared to reference SE images, or undergo any other evaluation process.

Figure 2:
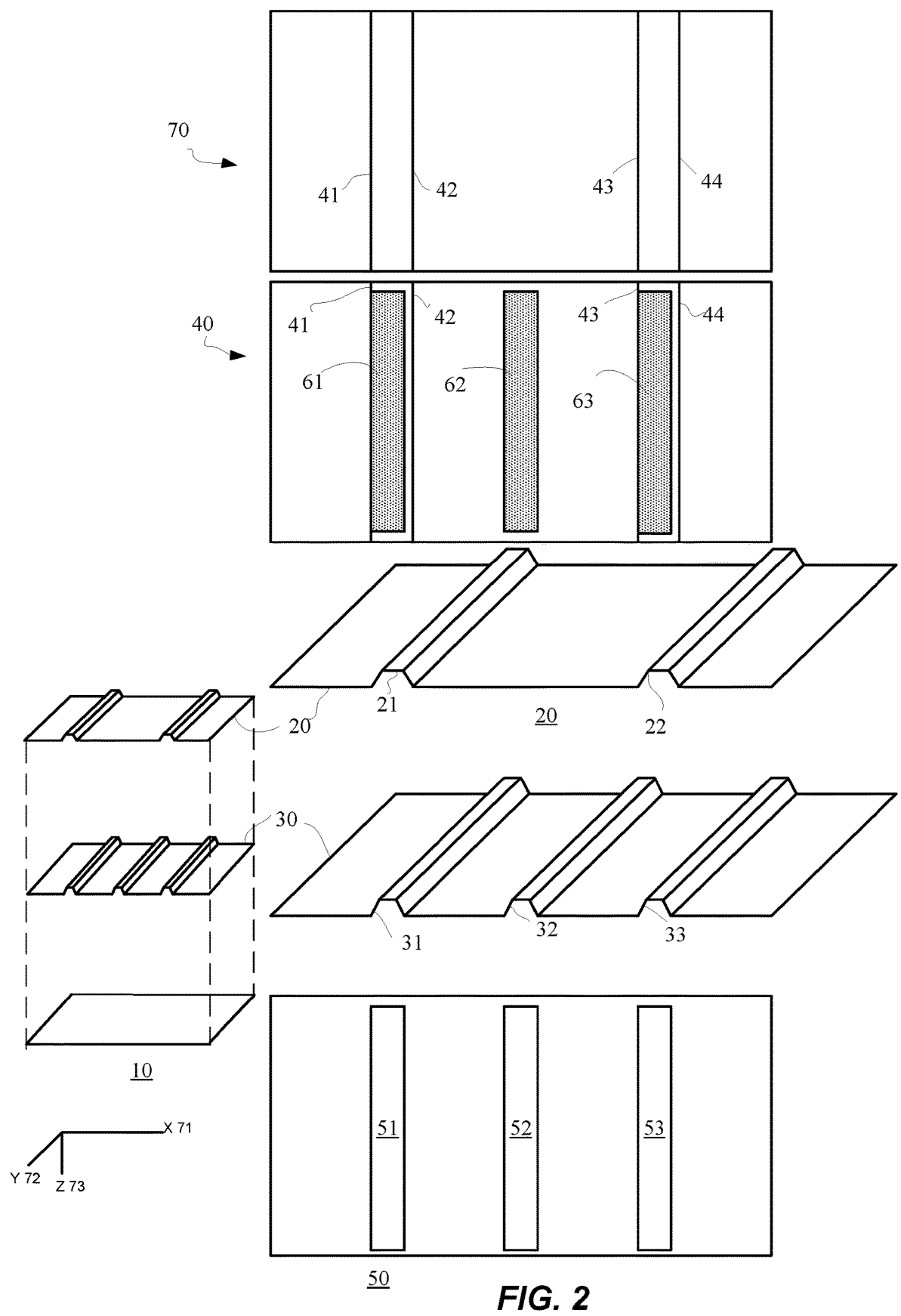
FIG. 2 is an example of a region of a sample.

FIG. 2 is an example of a region 10 of a sample, a BSE image 50, a SE image 40 and a BSE compensated SE image 70.

FIG. 2 includes a cartesian coordinate system in which the z-axis (93) corresponds to the depth of the region, whereas the x-axis (91) and the y-axis (92) are applicable per layer of the region. Items that are directly below each other have the same (X,Y) coordinates.

The region 10 of FIG. 2 is three dimensional and includes multiple patterns layers, such as upper layer 20 and intermediate layer 30. There may be any number of patterned layers and of unpatterned layers.

Upper layer 20 is illustrated as including a first line 21 and a second line 22. Each line of the first line and the second line includes a pair of edges that should be visible in a SE image.

Intermediate layer 30 is illustrated as including a third line 31, a fourth line 32 and a fifth line 33.

Any layer of the region may include any type of structural elements—for example a line, a bump, a trench, and the like. The structural elements may form an array of elements, may be organized in an order manner or may be organized in a non-ordered manner.

In FIG. 2, a part of first line 21 is directly above a part of third line 31, and a part of second line 22 is directly above a part of the fifth line 33. This spatial relationships may introduce BSE induced error in the detected SE signals.

BSE image 50 that includes a first BSE area 51 that represents a detection of BSC emitted from the third line 31, a second BSE area 52 that represents a detection of BSC emitted from the fourth line 32, and a third BSE area 53 that represents a detection of BSC emitted from the fifth line 33.

SE image 40 includes relevant SE information and BSE induced error information.

The relevant SE information includes first edge information 41, second edge information 42, third edge information 43 and fourth edge information 44.

The first edge information 41 and the second edge information 42 represent a detection of SE emitted from edges of the first line as a result of an illumination of the first line with the electron beam.

The third edge information 43 and the fourth edge information 44 represent a detection of SE emitted from edges of the second line as a result of an illumination of the second line with the electron beam.

The BSE induced error information includes (a) a first BSE induced error area 61 that represents a detection of SE emitted from the region due to an emission of BSE from the third line 31, (b) a second BSE induced error area 62 that represents a detection of SE emitted from the region due to an emission of BSE from the fourth line 32, and (c) a third BSE induced error area 63 that represents a detection of SE emitted from the region due to an emission of BSE from the fifth line 33.

In the BSE compensated SE image 70, the BSE induced error information was removed leaving the first edge information 41, second edge information 42, third edge information 43 and fourth edge information 44.

Figure 3:
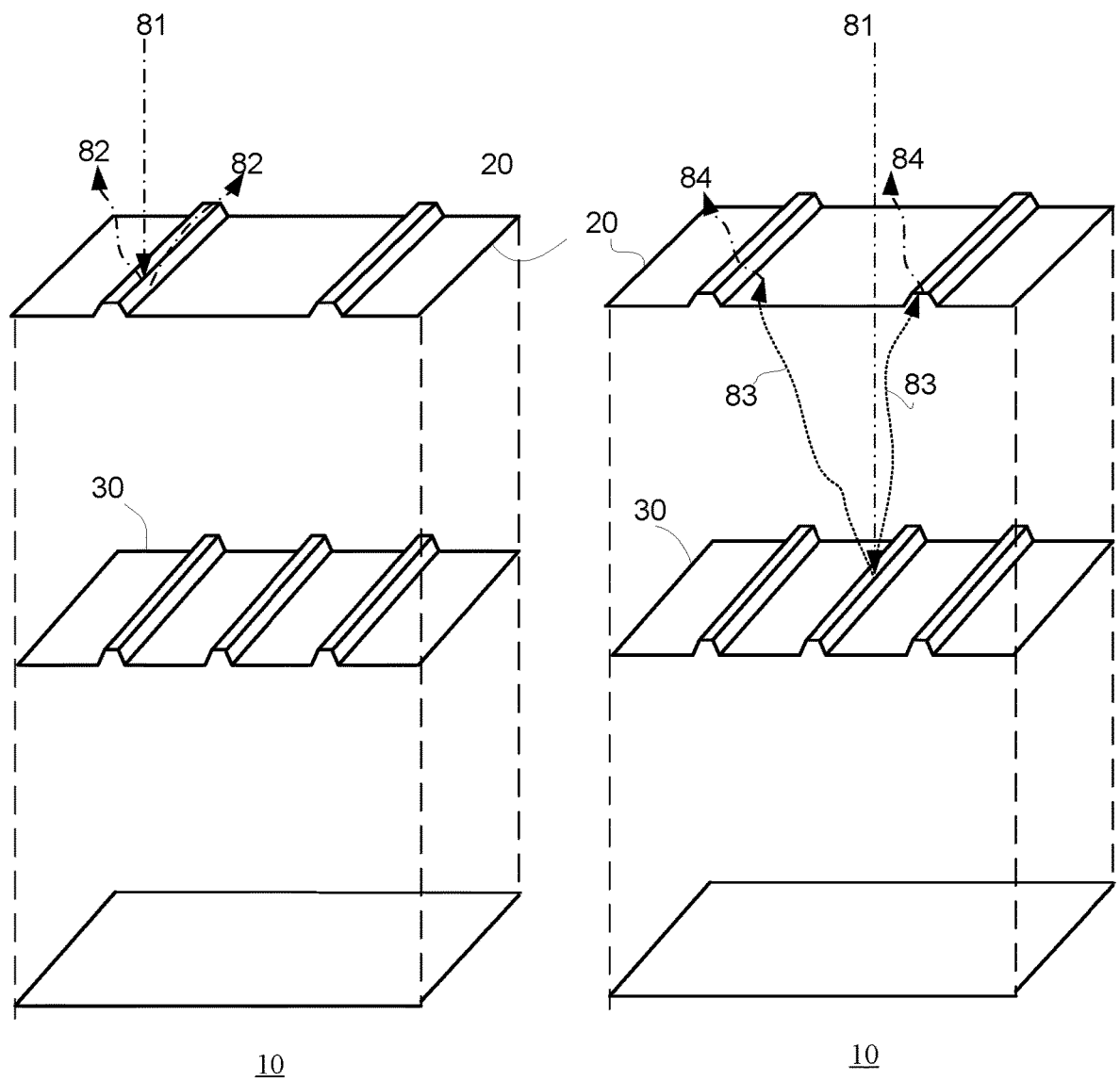
FIG. 3 is an example of a region of a sample.

FIG. 3 illustrates an example of SE 82 emitted from the first line due to an illumination of the first line with an electron beam 81.

FIG. 3 also illustrates an example an illumination, with electron beam 81, of the fourth line 34, the emission of BSE 83 from the fourth line, the impingement of the BSE 83 on the first layer 20 and the emission of BSE induced error signals, such as SE 84.

Figure 4:
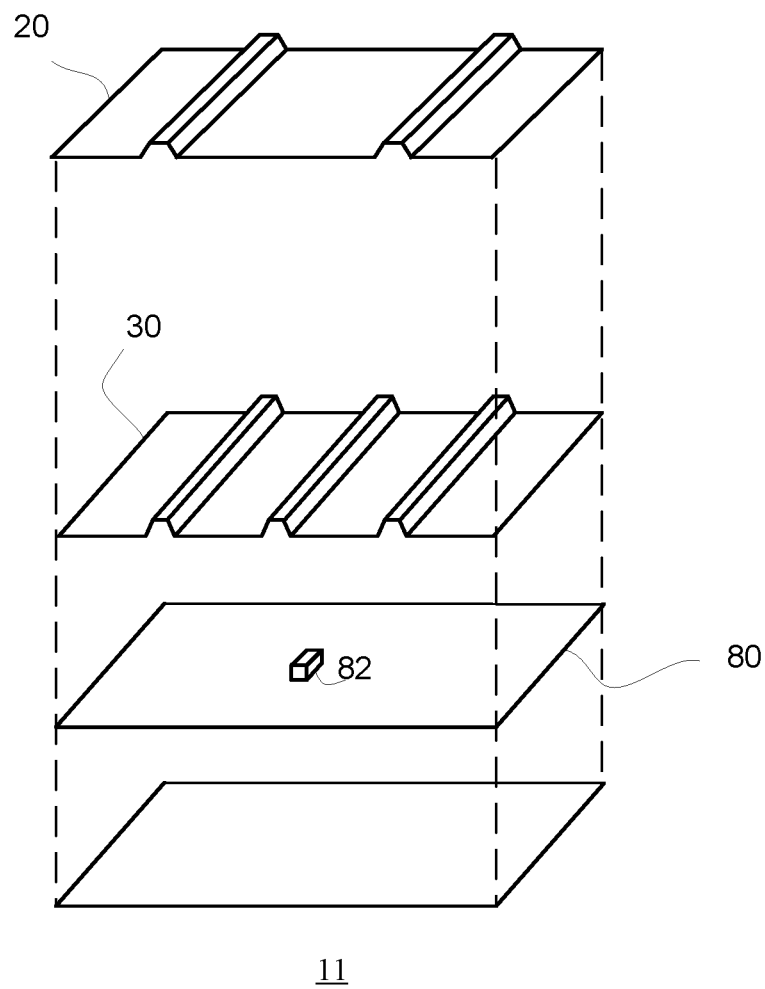
FIG. 4 is an example of a region of a sample.

While FIGS. 2 and 3 illustrated two patterned layers, FIG. 4 illustrates a region 11 that includes upper layer 20, intermediate layer 30 and an additional layer 80 located below the intermediate layer and includes an additional structural element 82 that may emit BSE that may cause additional BSE induced error signals to be emitted from the region.

Figure 5:
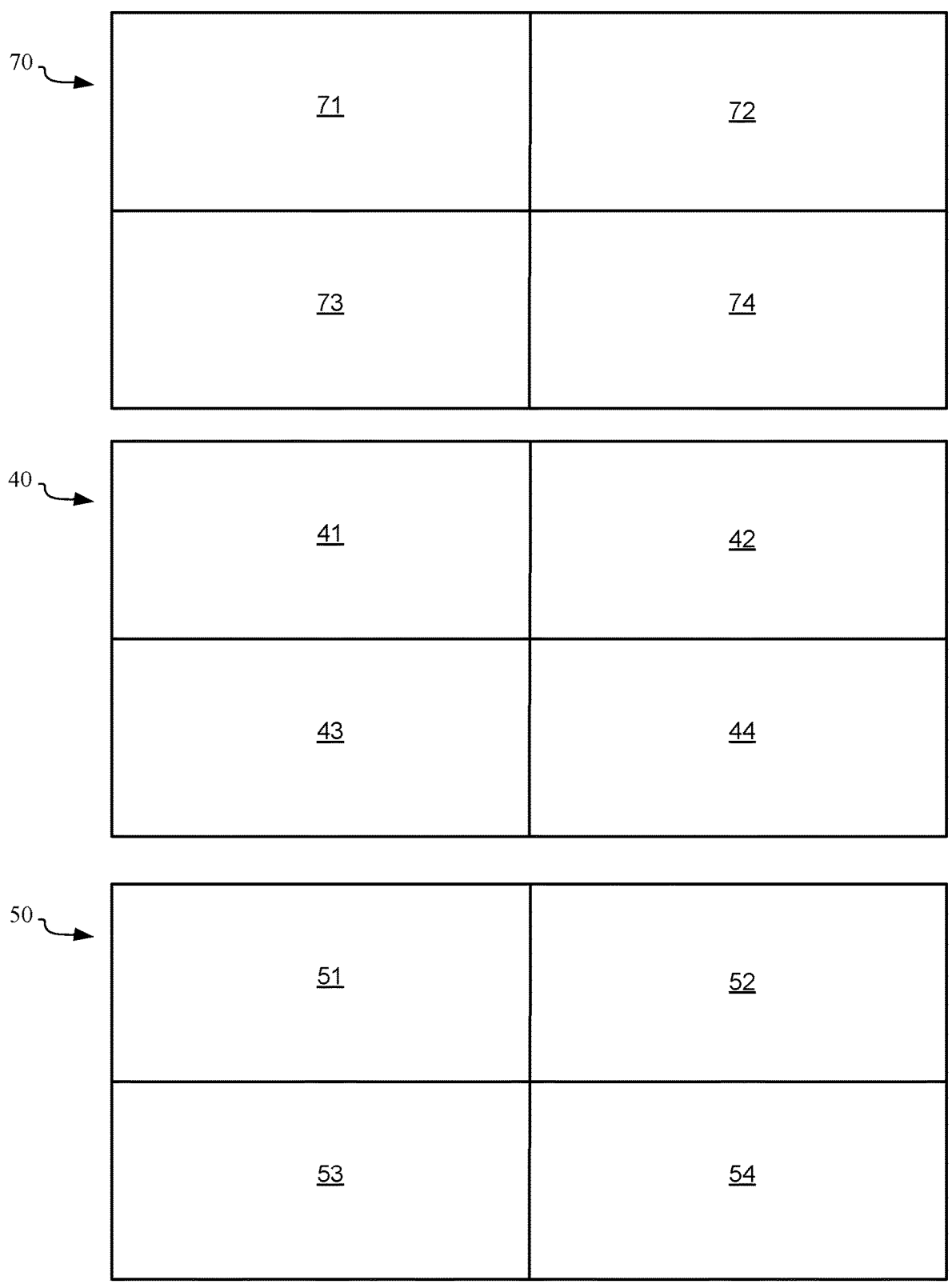
FIG. 5 is an example of a parts of electron images.

FIG. 5 illustrates a virtual segmentation of the SE image 40 to SE image parts 41, 42, 43 and 44, a virtual segmentation of the BSE image 50 to corresponding BSE image parts 51, 52, 53 and 54, and the virtual segmentation of the BSE compensated SE image 70 to corresponding BSE compensated SE image parts 71, 72, 73 and 74. Different BSE correction factors can be applied for the different parts.

Figure 6:
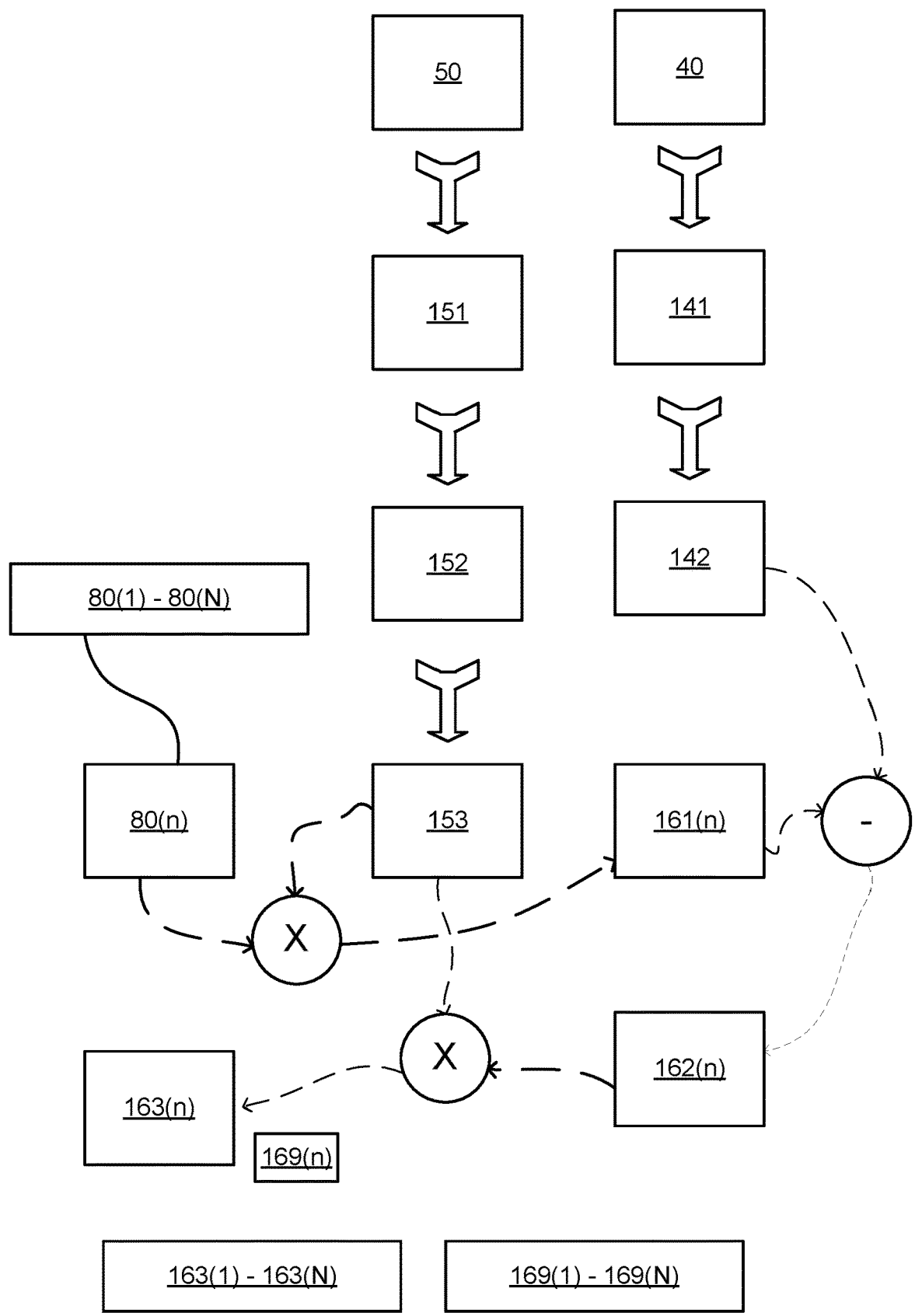
FIG. 6 is an example of various steps of a method and various data structures.

FIG. 6 illustrates an example of various steps of method 100 and various data structures.

FIG. 6 illustrates the following:

Smoothing the SE image 40 to provide a smoothed SE image 141.

Applying a gradient operation on the smoothed SE image 141 to provide a gradient SE image 142, which is an example of a processed SE image.

Smoothing the BSE image 50 to provide a smoothed BSE image 151.

Applying a gradient operation on the smoothed BSE image 151 to provide a gradient BSE image 152, which is an example of a processed BSE image.

Thresholding the gradient BSE image 152 to provide the processed BSE image 153.

Assuming that N BSE correction factors (80(1)-80(N)) are evaluated (N being a positive integer) and that index n ranges between 1 and N. Under these assumption the evaluation of the n'th BSE correction factor ($80(n)$) includes:

Multiplying the processed BSE image 153 by the n'th BSE correction factor $80(n)$ to provide a first intermediate image $161(n)$.

Subtracting the first intermediate image $161(n)$ from the gradient SE image 142 to provide a second intermediate image $162(n)$.

Multiplying the second intermediate image $162(n)$ by the gradient BSE image 152 to provide a third intermediate image $163(n)$.

Calculating a parameter $169(n)$ of the third intermediate image $163(n)$.

After checking N BSE correction factors ($80(1)$-$80(N)$) there are N third intermediate images $163(1)$-$163(N)$ having N parameter $169(1)$-$169(N)$—and one of the BSE correction factors is selected based on the value of its parameter. For example—selecting the parameter that is indicative of the lowest BSE induced error.

Figure 7:
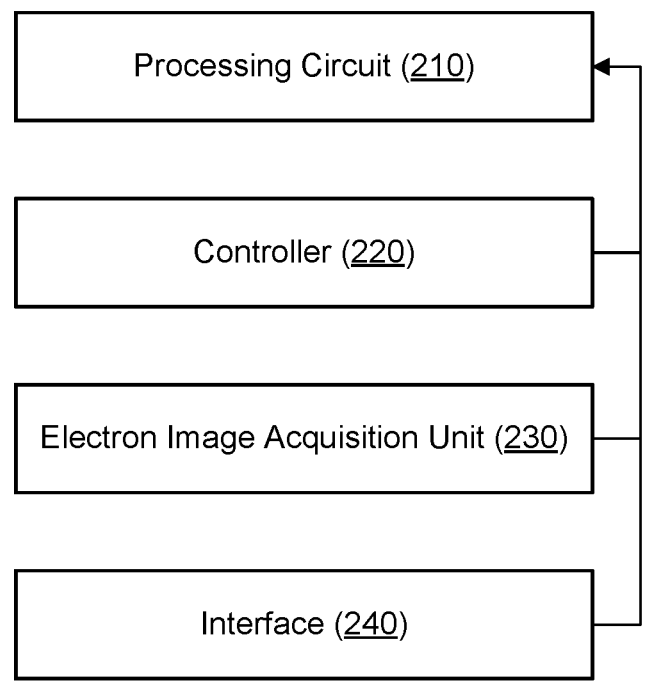
FIG. 7 is an example of a system.

FIG. 7 is an example of a system 200.

System 200 may include a processing circuit 210 configured to process electron images and may be configured to execute at least some steps of method 100.

The processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

System 200 may also include a controller 220 for controlling various elements of the system 200.

System 200 may include electron image acquisition unit 230 for acquiring the SE image and/or the BSE image.

The system 200 may be an electron microscope, an electron imager, or may be a computerized system that receives the electron image from electron microscope, an electron imager, and the like.

System 200 may include a communication unit or an interface 240 for receiving the electron image.

Assuming that the region of the object is illuminated with a primary electron beam. The illumination causes surface secondary electrons to be emitted in a directional manner, causes backscattered electrons to be emitted from locations below the surface, whereas the emission of the backscattered electrons also causes the emission of BSE-induced secondary electrons in a non-directional manner.

Non-directional manner means that the BSE-induced secondary electrons are virtually omni-directional manner or otherwise do not convey topographic information.

For example, the BSE-induces secondary electrons are emitted from an area that well exceeds a spot of the primary electron beam and well exceeds at least one dimension of a structural element of the region. For example, the BSE induces secondary electrons may be emitted from a large area around each pixel for several microns in high kV scenarios causing local edges to be averaged out.

The surface secondary electrons are emitted in a directional manner that reflects the topography of the surface of the region. For example, the surface secondary electrons may be virtually amplified close to an edge. In addition, surface secondary electrons that are emitted from a left edge tend to propagate at different paths than surface secondary electrons that are emitted from a right edge tend to reach secondary electron detector located to the right of the region.

Assuming that the secondary electrons are detected by different secondary electron detectors that view the region from different directions. Under this assumption each of the different secondary electron detectors will detect the same amount of BSE-induced secondary electrons, while the topography of the region will cause a difference in the detection of surface secondary electrons by the different secondary electron detectors.

Given that the BSE-induced secondary electrons are BSE induced error signals, they may be ignored (or may be dramatically attenuated) by subtracting the detections signals from one secondary electron detector from the detection signals of another secondary electron signals. The difference will represent the difference in the topography sensed by different detectors. Whereas the non-topographic content of the additional SE will be cancelled out.

A separate subtraction can be made between each pair of secondary electron detectors.

For example, assuming four SE detectors that have optical axes that differ from each other by ninety degrees, then the detection signals of each pair of the four SE may be calculated and the difference will be indicative of the different topography sensed by the different SE detectors and the BSE-induced secondary electrons are ignored of.

Figure 8:
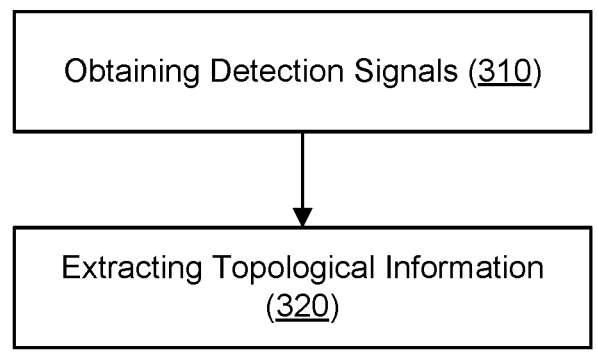
FIG. 8 is an example of a method.

FIG. 8 illustrates an example of method 300.

Method 300 may start by step 310 of obtaining detection signals from different secondary electrons that view a region of a surface from different directions.

The detection signals are generated as a result of an illumination of the region of the surface with a primary electron beam.

Step 310 may be followed by step 320 of extracting topological information regarding a surface of the region of the object and suppressing backscattered electron (BSE)-induced secondary electrons by subtracting (a) detection signals from a first secondary detector (SE) detector of the different SE detectors, from (b) detection signals from a second SE detector of the different SE detectors to provide a first difference.

If the different secondary electron detectors include additional secondary electron detectors (other than the first SE detector and the second SE detector) then step 320 may include performing subtractions between detection signals of other pairs of the different SER detectors to provide.

Step 320 may include reconstructing a topography of the region based one or more differences.

Figure 9:
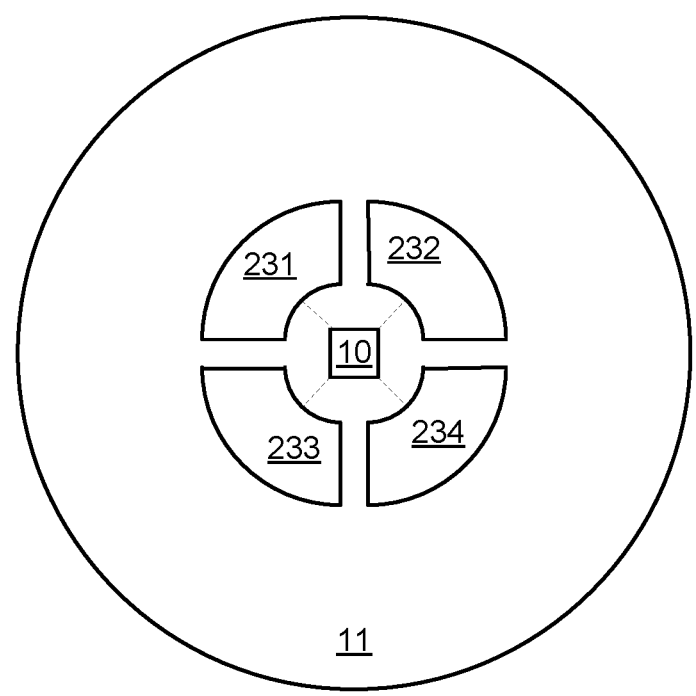
FIG. 9 is an example of a wafer and different secondary electron detectors.

FIG. 9 illustrates an example of a wafer 11 and a region 10 that may emit secondary electrons towards four difference SE detectors 231, 232, 233 and 234—that view the region from different angles.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosures containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

What is claimed is:

1. A method for improving a quality of a secondary electron image of a region of a sample, the method comprising:
    scanning the region with an electron beam to generate a backscattered electron (BSE) image of the region and a secondary electron (SE) image of the region;
    processing the BSE image with a smoothing function to remove random noise and generate a processed BSE image having an increased signal-to-noise ratio;
    processing the SE image with a smoothing function to remove random noise and generate a processed SE image having an increased signal-to-noise ratio;
    evaluating BSE induced error reduction obtained for a plurality of BSE correction factors by, for each BSE correction factor in the plurality of BSE correction factors: (a) multiplying the processed BSE image by the BSE correction factor to provide a first intermediate image, (b) subtracting the first intermediate image from the processed SE image to provide a second intermediate image, (c) multiplying the second intermediate image by the processed BSE image to provide a third intermediate image, and (d) calculating a parameter of the third intermediate image; and
    selecting, out of the multiple BSE correction factors, one or more selected BSE correction factors indicative of a lowest BSE induced error; and
    applying the one or more selected BSE correction factors on one or more parts of the processed BSE image to generate a BSE compensated SE image.

2. The method according to claim 1 wherein the calculating of the parameter of the third intermediate image evaluating comprises calculating a sum of pixels of the third intermediate image.

3. A method for improving a quality of a secondary electron image of a region of a sample, the method comprising:
    scanning the region with an electron beam to generate a backscattered electron (BSE) image of the region and a secondary electron (SE) image of the region;
    processing the BSE image with a smoothing function to remove random noise and generate a processed BSE image having an increased signal-to-noise ratio;
    processing the SE image with a smoothing function to remove random noise and generate a processed SE image having an increased signal-to-noise ratio;
    evaluating BSE induced error reduction obtained for a plurality of BSE correction factors;
    selecting, out of the plurality of BSE correction factors, one or more selected BSE correction factors indicative of a lowest BSE induced error; and
    applying the one or more selected BSE correction factors on one or more parts of the processed BSE image to generate a BSE compensated SE image by multiplying the part of the processed BSE image by the selected BSE correction factor to provide a first intermediate image and subtracting the first intermediate image from a corresponding part of the processed SE image.

4. The method according to claim 3 wherein the processing of the SE image comprises smoothing the SE image to provide a smoothed SE image and applying a gradient operation on the smoothed SE image to provide the processed gradient SE image.

5. A method for improving a quality of a secondary electron image of a region of a sample, the method comprising:
    scanning the region with an electron beam to generate a backscattered electron (BSE) image of the region and a secondary electron (SE) image of the region;
    processing the BSE image by smoothing the BSE image to provide a smoothed BSE image, applying a gradient operation on the smoothed BSE image to provide a gradient BSE image, and thresholding the gradient BSE image to provide the processed BSE image;
    processing the SE image with a smoothing function to remove random noise and generate a processed SE image having an increased signal-to-noise ratio;
    evaluating BSE induced error reduction obtained for a plurality of BSE correction factors;
    selecting, out of the plurality of BSE correction factors, one or more selected BSE correction factors indicative of a lowest BSE induced error; and
    applying the one or more selected BSE correction factors on one or more parts of the processed BSE image to generate a BSE compensated SE image.

6. The method according to claim 5 wherein the thresholding comprises applying a threshold that has a value that is set based on a range of pixel values of pixels of the gradient BSE image.

7. The method according to claim 6 wherein the thresholding comprises resetting pixels of the gradient BSE image that have a value that is below the threshold.

8. The method according to claim 5 wherein the one or more selected BSE correction factors are a single BSE correction factor, the one or more parts of the processed BSE image are the processed BSE image, and one or more corresponding parts of the processed SE image are the processed SE image.

9. The method according to claim 5 wherein the the processed BSE image comprises two or more parts, and the processed SE image comprises two or more parts.

10. The method according to claim 9 wherein the two or more parts of the processed BSE image form the processed BSE image, and the two or more parts of the processed SE image form the processed SE image.

11. The method according to claim 9 wherein the two or more parts of the processed BSE image are only some of the parts of the processed BSE image, and the two or more parts of the processed SE image are only some of the parts of the processed SE image.

12. The method according to claim 9 wherein the two or more parts of the processed BSE image are related to structural elements of the sample that are located at different depths.

13. A system for improving a quality of a secondary electron image of a region of a sample, the system comprising a processing circuit that is configured to cause the system to:
    scan the region with an electron beam to generate a backscattered electron (BSE) image of the region and a secondary electron (SE) image of the region;
    process the BSE image by smoothing BSE image to provide a smoothed BSE image, applying a gradient operation on the smoothed BSE image to provide a gradient BSE image, and thresholding the gradient BSE image to provide a processed BSE image;
    process the SE image with a smoothing function to remove random noise and generate a processed SE image having an increased signal-to-noise ratio;
    evaluate BSE induced error reduction obtained for a plurality of BSE correction factors;
    select, out of the plurality of BSE correction factors, one or more selected BSE correction factors indicative of a lowest BSE induced error; and
    apply the one or more selected BSE correction factors on one or more parts of the processed BSE image to generate a BSE compensated SE image.

* * * * *